United States Patent [19]

France

[11] Patent Number: 4,610,185
[45] Date of Patent: Sep. 9, 1986

[54] ROTATABLE MASTER DIE SET AND QUICK CHANGE UNIT DIE SYSTEM

[76] Inventor: Daniel E. France, 8010 NW. 1st Ave., Vancouver, Wash. 98665

[21] Appl. No.: 604,147

[22] Filed: Apr. 26, 1984

[51] Int. Cl.$^4$ .................. B23D 65/02; B26F 1/06
[52] U.S. Cl. .................................... 76/29; 83/685
[58] Field of Search ............... 76/29, 25 R; 83/681, 83/684, 685, 686, 515, 518, 697

[56] References Cited

U.S. PATENT DOCUMENTS

| | | | |
|---|---|---|---|
| 2,510,462 | 6/1950 | Christenson | 76/29 |
| 2,545,560 | 3/1951 | Scott | 83/686 |
| 2,956,321 | 10/1960 | Halward . | |
| 3,982,458 | 9/1976 | Terasaka | 83/685 |

OTHER PUBLICATIONS

The title page, copyright page, and pp. 104-108 of Basic Diemaking by D. Eugene Ostergaard.
A four page brochure of the Hovis Screwlock Company describing the Hovis Universal Master Compound Die.
Bulletin WSC-73, having 10 pages, of S. B. Whistler and Sons, Inc., entitled Reusable Punching and Notching Die Systems.
Catalog No. 201, having 16 pages, of the Danly Machine Corporation, entitled Punchrite Ball-Lock Components.

Primary Examiner—Roscoe V. Parker
Attorney, Agent, or Firm—Chernoff, Vilhauer, McClung & Stenzel

[57] ABSTRACT

A master die set and unit die system for use with a punch press, the master die set adapted to receive, align, clamp and release unit dies of standard dimensions so that unit dies may be quickly changed in the master die set while the master die set is operably installed in a punch press. The upper shoe of the master die set includes a sliding dovetail to align and clamp a punch holder plate of standard dimensions, the sliding dovetail operated by a single clamping screw. The opposed bottom shoe of the master die set includes a recessed pocket and clamps to align and clamp a unit die blank of standard dimensions in registry with the punch holder plate. The master die set is attached to the punch press by bearings so that the entire die set can rotate with respect to the punch press to cut saw teeth having the same tooth length, but different gullet depths, with the same die. Gage blocks are provided with the saw tooth cutting die to determine the amount of rotation necessary to cut saw teeth having a particular gullet depth.

18 Claims, 5 Drawing Figures

ROTATABLE MASTER DIE SET AND QUICK CHANGE UNIT DIE SYSTEM

BACKGROUND OF THE INVENTION

This invention relates to die sets and dies of the type used in punch presses, and particularly to a rotatable master die set accomodating a quick-change unit die system wherein unit dies may be quickly and easily removed, installed, aligned, and clamped in the master die set. The invention also relates to a method of using such a rotatable master die set to form saw teeth of variable gullet depth using a common unit die.

Die sets for use with a punch press typically have a pair of opposed shoes which are moveable with respect to each other for moving a punch with respect to a die opening. These die sets are commonly installed in a punch press by rigidly fixing one shoe to the bed of the punch press and the other shoe to the ram of the punch press. Prior to installation of the die set in a punch press, a die, consisting essentially of a punch and a mating die opening, are respectively fixed to the opposing shoes of the die set in registry with one another.

The most common method of attaching a die to a die set is with an arrangement of screws and dowels. Such screws typically extend through a smooth bore in the shoe and into a threaded bore in the hardened steel of the die block, making it impossible to remove the screws while the die set is installed in the punch press. The dowels are used to accurately position the die block on the shoe and, accordingly, fit tightly into the holes which are formed into the die block and the shoe. Due to this necessarily tight fit, the die block cannot be lifted off its shoe while the shoe is installed in the punch press, but the shoe must be removed from the press and the dowels drifted out with a hammer and drift. A punch or punch holder would be attached to the opposing shoe of the die set in a similar manner, and would also be difficult and time consuming to remove. Since die sets with installed dies can be quite heavy, they are usually installed and removed from a punch press with the aid of a fork lift or hoist.

Due to the aforementioned difficulties in removing and reinstalling dies on die sets, a die is customarily allowed to remain on a die set and the die sets are changed on the punch press, rather than changing the dies on the die sets. This practice is expensive, necessitating the purchase of many die sets, and is also inconvenient because of the time and equipment required to replace the whole die set on the punch press.

One approach to facilitating the changing of dies is to use master die sets with T-slots or channels formed therein in which replacement dies can be clamped. However, with such a system it is still necessary to perform the time-consuming steps of aligning the punch and die opening in the die set in precise mating relationship with each other each time the die is placed in the die set.

Another approach to this problem utilizes an integral punch and die opening which are mounted in a C-frame so that the punch and die opening are always aligned in registry with one another.

Still another approach has been to use a universal master compound die with interchangeable die parts to enable a single die to make a variety of parts and thereby reduce the number of times it is necessary to change the die. Such a system is provided by the Hovis Screw Lock Company of Warren, Mich.

Another difficulty associated with typical die set-ups is the inconvenience of angularly reorienting the die with respect to the workpiece. As can be easily envisioned, it would be very time consuming to rotate and fix one of the die pieces, then align the independently supported mating die piece and fix it into position. One situation where such a reorientation of the die is desired is in the manufacture of saw blades. A particular saw mill may desire a saw blade having teeth with a deeper or shallower gullet than is standard. The same die may be rotated to form saw teeth of the same tooth size, but of different gullet depth. Rotating and aligning the die pieces separately is very time-consuming, and because it takes up valuable production time, very expensive.

SUMMARY OF THE INVENTION

The present invention overcomes the problems discussed above by providing a rotatable master die set with a quick change unit die system.

A master die set according to the present invention includes a pair of opposed shoes interconnected by guide posts and bushings to prevent any movement with respect to each other except for reciprocal movement parallel to the axes of the guide posts.

The underside of the top shoe is fitted with a pair of opposed dovetails, one fixed, and one sliding, to receive and align a punch holder plate of standard dimensions, the sliding dovetail forcing the punch plate into alignment against the fixed dovetail. The punch holder plate has a pair of opposed downwardly-facing edges which cooperate with the upwardly-facing surfaces of the dovetails to force the punch plate tightly against the underside of the top shoe.

The bottom shoe has a generally retangular pocket formed therein to receive a die blank of standard dimensions, two adjacent sides of the pocket having wear plates to align the die blank in the bottom shoe in registry with the punch holder attached to the top shoe. A pair of toe clamps opposite the wear plates force the die blank into alignment against the wear plates. The toe clamps have downwardly-angled faces which cooperate with upwardly-angled channels in the die blank to force the die blank tightly against the bottom shoe.

The unit die system of the present invention includes a punch holder plate of standard dimensions and a die blank of standard dimensions. A die opening may be formed in the die blank, or a die block or button having the die opening already formed therein may be mounted on the die blank. A punch is mounted to the punch holder plate in registry with the die opening. Since the top and bottom shoes are aligned with each other by the guide posts and bushings, mounting the punch plate on the top shoe and the die blank in the bottom shoe aligns them with each other.

The pieces of the unit die may be quickly, easily, and repeatedly mounted in the master die set in identical registry with each other without any manual alignment. A single screw operates the sliding dovetail and a pair of screws respectively operate the two toe clamps. The unit die may be removed from the master die set while the master die set is operably installed in the punch press and usually without the need for a hoist or fork lift.

The top shoe of the master die set has a shank which connects the shoe to the ram of the punch press, the shank including a bearing so that the top shoe may freely rotate with respect to the punch press. The bottom shoe is mounted to the bed of the press by a base plate which incorporates a circular bearing coaxial with the shank bearing to allow the top and bottom shoe to rotate in unison when they are interconnected by the guide posts. The base plate has arcuate T-slots formed in the bottom thereof which receive bolts extending through the bottom shoe and the base plate. Tightening the bolts into T-nuts fitted into the T-slots allow the master die set to be selectively oriented with respect to the punch press and workpiece.

The rotatable master die set may be used with a single unit die to form saw teeth of substantially the same length and varying gullet depth by loosening the bolts which extend through the bottom shoe and into the base plate and rotating the entire die set with respect to the workpiece. A pair of dowels projecting horizontally from the bottom shoe are rotated into abutment with gage blocks which are mounted on gage block posts set into the base plate to determine the amount of rotation needed to cut a saw tooth having a particular gullet depth. A set of gage blocks are designed for use with a particular tooth cutting die.

Accordingly, it is a principal object of the present invention to provide a master die set adapted to receive unit dies of identical dimensions.

It is a further object of the present invention to provide a unit die system for use with the aforementioned master die set.

It is an object of the present invention to provide a master die set and unit die system which enables unit dies to be quickly and easily changed and aligned in the master die set.

It is a further object of the present invention to provide a master die set and unit die system in which dies may be conveniently changed while the master die set is installed in the punch press.

It is a further object of the present invention to provide a master die set capable of angularly repositioning dies in a punch press while maintaining the alignment of the die pieces with respect to each other.

It is a further object of the present invention to provide a method for conveniently rotating a die set, including a die, to form saw teeth of varying gullet depth.

It is a further object of the present invention to provide a set of gage blocks in combination with a die for accurately and conveniently cutting saw teeth of different gullet depth.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
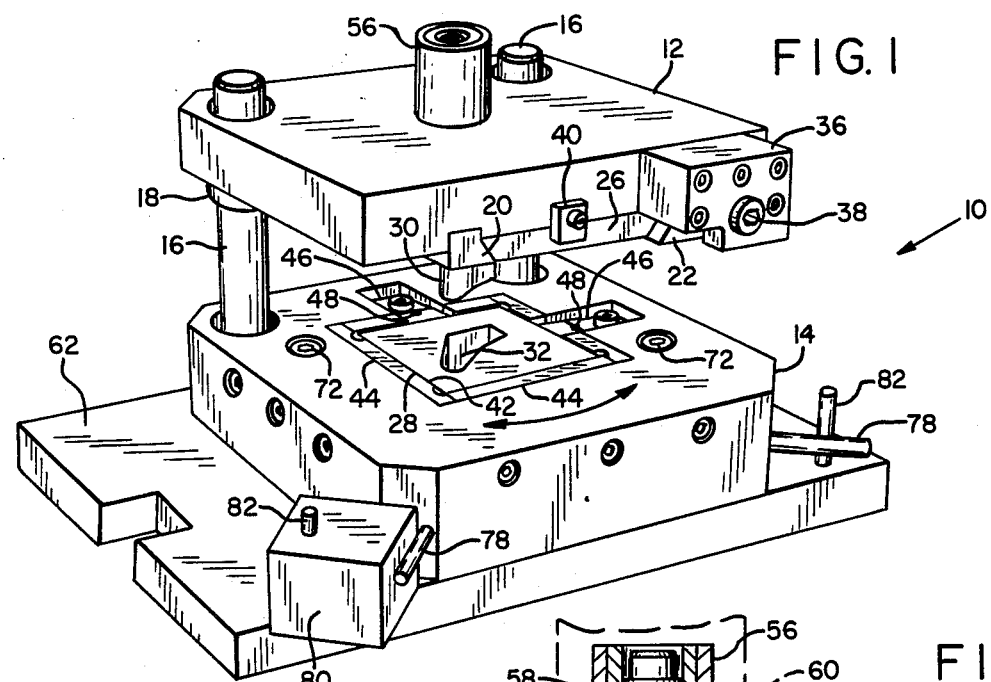
FIG. 1 is a perspective view of the master die set and unit die system of the present invention having a die installed therein.

As can be seen in FIG. 1, the master die set 10 of the present invention includes a pair of opposed shoes, a top shoe 12 and a bottom shoe 14. The shoes are interconnected by a pair of guide posts 16 which extend upwardly from the bottom shoe and are slideably received by the top shoe in closely fitting bushings 18. The guide posts and bushings serve to prevent all relative movement between the two shoes except for up and down movement parallel to the axes of the guide posts.

The unit die system of the present invention includes a unit punch plate 26 of predetermined dimensions and a unit die blank 28 of predetermined dimensions. The two pieces of a complete die, a punch 30 and a die opening 32, are respectively arranged on the punch plate and the die blank in registry with one another. The punch, or intermediate punch holder, may be mounted onto the punch plate by any suitable means such as screws and dowels. The die opening may be formed into the die blank, or a die block or die button having the die opening already formed therein may be attached to the die blank, in mating registry with the punch. Once the two mating pieces of a die have been arranged on the punch plate and die blank respectively, in registry, the two assemblies together are a unit die.

Figure 2:
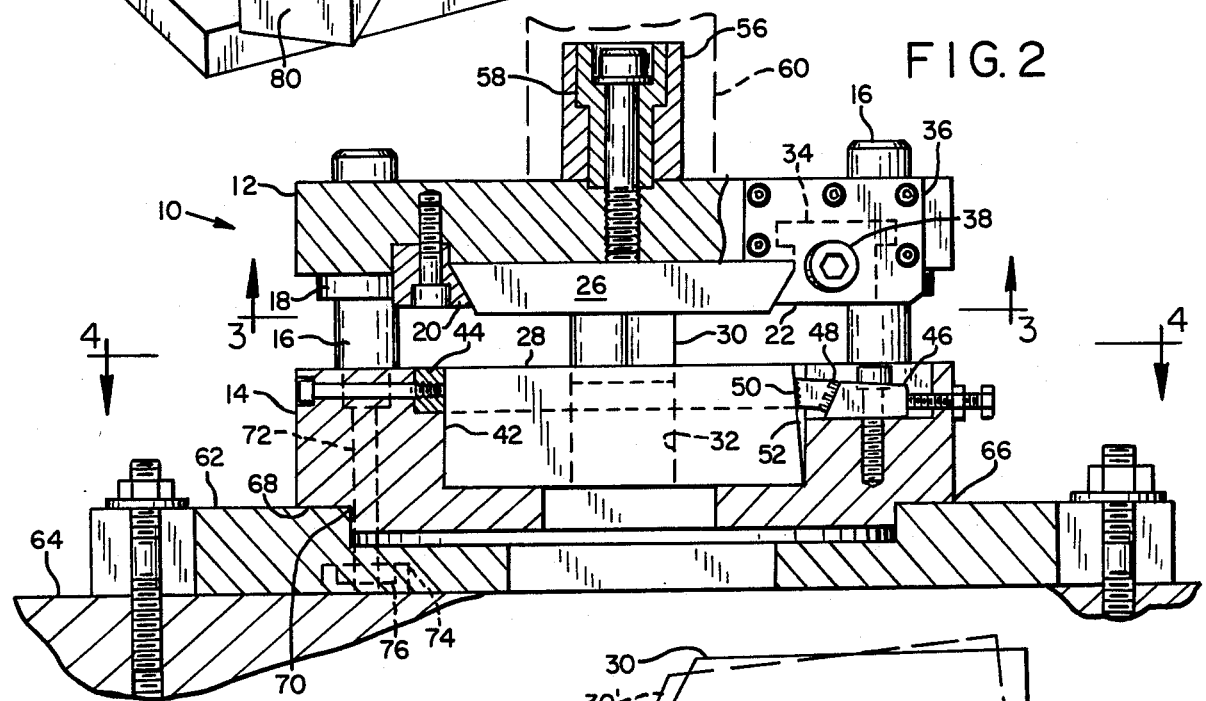
FIG. 2 is a partially cut away elevational view of the master die set and unit die system.
Figure 3:
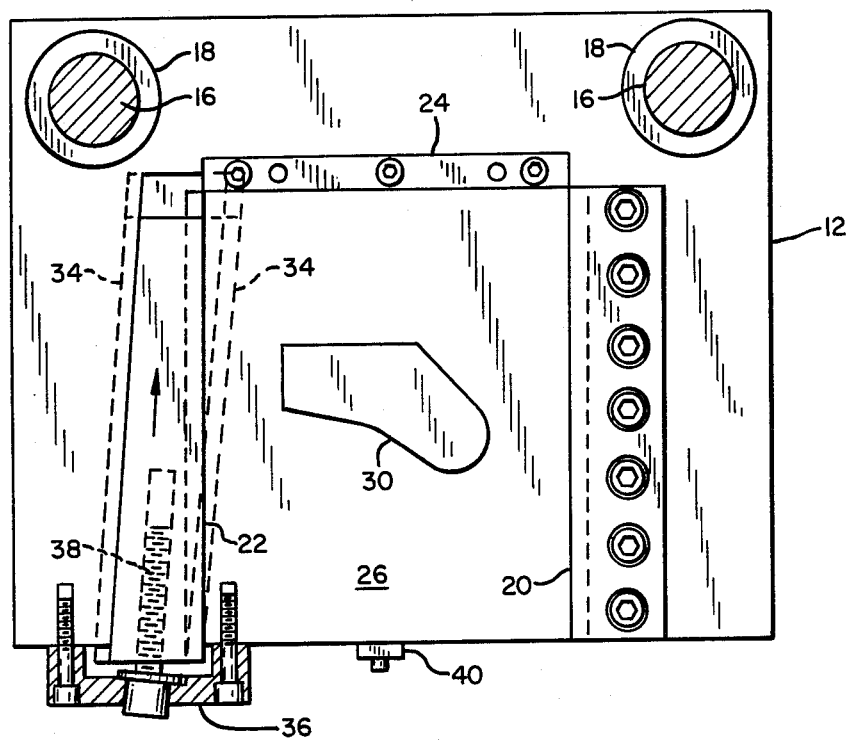
FIG. 3 is a sectional plan view of the master die set and unit die system taken along lines 3—3 of FIG. 2.

Each shoe of the master die set includes a receptacle for receiving, aligning, and retaining the punch plate and the die blank of the unit die. As can be seen in FIGS. 1, 2 and 3, the receptacle of the top shoe is defined by a fixed dovetail 20, a parallel-oriented sliding dovetail 22 and a back rail 24 extending perpendicular to, and between, the rearward ends of the dovetails. The fixed dovetail and the back rail are securely fixed to the underside of the top shoe by a plurality of screws and serve as alignment means to align the punch plate with respect to the top shoe. As shown in FIG. 2, both the fixed and sliding dovetail have upwardly-angled surfaces which cooperate and mate with the opposing downwardly-angled edges of the punch plate to supportably retain the punch holder plate on the underside of the top shoe.

The sliding dovetail is slideably supported on a pair of gibbs 34 shown in dashed lines in FIGS. 2 and 3. As can be seen in FIG. 3, the gibbs are not parallel to the dovetails, but angle toward the center of the shoe as they extend toward the rear of the shoe so that as the sliding dovetail moves toward the rear of the shoe, the inner edge of the sliding dovetail moves toward the fixed dovetail, all the while maintaining its parallel orientation to the fixed dovetail. This movement of the sliding dovetail forces the punch plate against the fixed dovetail, aligning it and also forcing it tightly against the undersurface of the top shoe.

A screw mounting bracket 36 carries a clamping screw 38 for rotation in the bracket, but prevents axial movement of the screw with respect to the bracket. The screw is received in a threaded bore in the sliding dovetail so that rotation of the screw in the bracket causes the sliding dovetail to move in or out on the gibbs, respectively clamping or releasing the punch plate.

A swivel clamp 40 may be used to insure that the punch holder plate is aligned against the back rail, but this function could be performed manually. Essentially, manipulation of the clamping screw is all that is required to install, align, clamp and remove the punch plate from the top shoe.

The receptacle of the bottom shoe includes a generally rectangular pocket 42 of appropriate dimensions to closely receive the unit die blank. A pair of wear plates 44 mounted on adjacent sides of the pocket serve as alignment means to align the die blank with respect to the bottom shoe. A pair of toe clamps 46 such as those distributed by J & S Tool Company of Livingston, N.J., are operably mounted proximate the sides of the pocket opposite the wear plates. Manipulation of the diagionally oriented adjustment screw 48 of each of the toe clamps forces the die blank tightly against the wear plates, thereby aligning the die blank with respect to the bottom shoe. The faces 50 of the toe clamps are angled downwardly and cooperate with upwardly-angled channels 52 in the sides of the die blank to exert a downward force on the die blank and keep it pressed tightly against the bottom shoe.

It will be understood that since the punch plate is precisely aligned with respect to the top shoe by the dovetails and back rail, the die blank is precisely aligned with respect to the bottom shoe by the wear plates and toe clamps, and the top shoe and bottom shoe are precisely aligned with respect to each other by the guide posts and closely fitting bushings, the punch plate and die blank are therefore precisely aligned with respect to each other.

It will also be apparent that the unit dies having punch plates and die blanks of uniform dimensions may be quickly and accurately installed, aligned, clamped and removed from the master die set. Once a unit die has been initially set up with the punch and die opening arranged in registry on the punch plate and die blank, that unit die may be installed, removed and reinstalled in the master die any number of times in precisely the same alignment, removing the necessity for realignment each time a die is used, and reducing the necessity for removing a die set from the punch press and installing another die set having a different die mounted thereon. Since the time spent installing, aligning and removing dies from die sets and die sets from the punch press is not spent in production, use of such a master die set and unit die system has significant economic advantages.

The removal, installation, alignment and clamping of a unit die in the master die set may be performed very quickly employing the present invention, and significantly, may be performed while the master die set remains installed in the punch press. Operation of the clamping screw 38 associated with the sliding dovetail is all that is required to remove, install, align and clamp the punch plate to the upper shoe. Similarly, operation of the two adjustment screws 48 of the toe clamps is all that is required to remove, install, align and clamp the die blank to the bottom shoe. Since it is only the punch plate and die blank with the associated die that are being replaced, it is usually possible to accomplish this replacement manually, without the need for a hoist or fork lift.

Another feature of the master die set and unit die system is that the unit die blank may be resurfaced many times and still be capable of use in the master die set. When a die opening is formed in a unit die blank it is formed through the whole depth of the die blank. As the upper surface of the die blank defining the die opening becomes worn or broken, the die blank may be resurfaced, sharply redefining the die opening. This may be accomplished a number of times, the resurfaced die blank fitted in the pocket 42 by placing a shim beneath the die blank until the shim is so thick as to interfere with the cooperation of the toe clamp face 50 and the channel 52 formed in the die blank.

Because of the time and inconvenience entailed in angularly realigning a die, dies are customarily not angularly reoriented with respect to the workpiece or punch press. The master die set of the present invention provides for quick angular repositioning of the die with respect to the workpiece without losing the alignment of the punch and die opening. Referring to FIG. 1, the top shoe 12 of the master die set is provided with a shank 56, incorporating a rotatable shank bearing 58 for rotatably attaching the top shoe to the ram 60 of the punch press for free rotation therewith.

Figure 4:
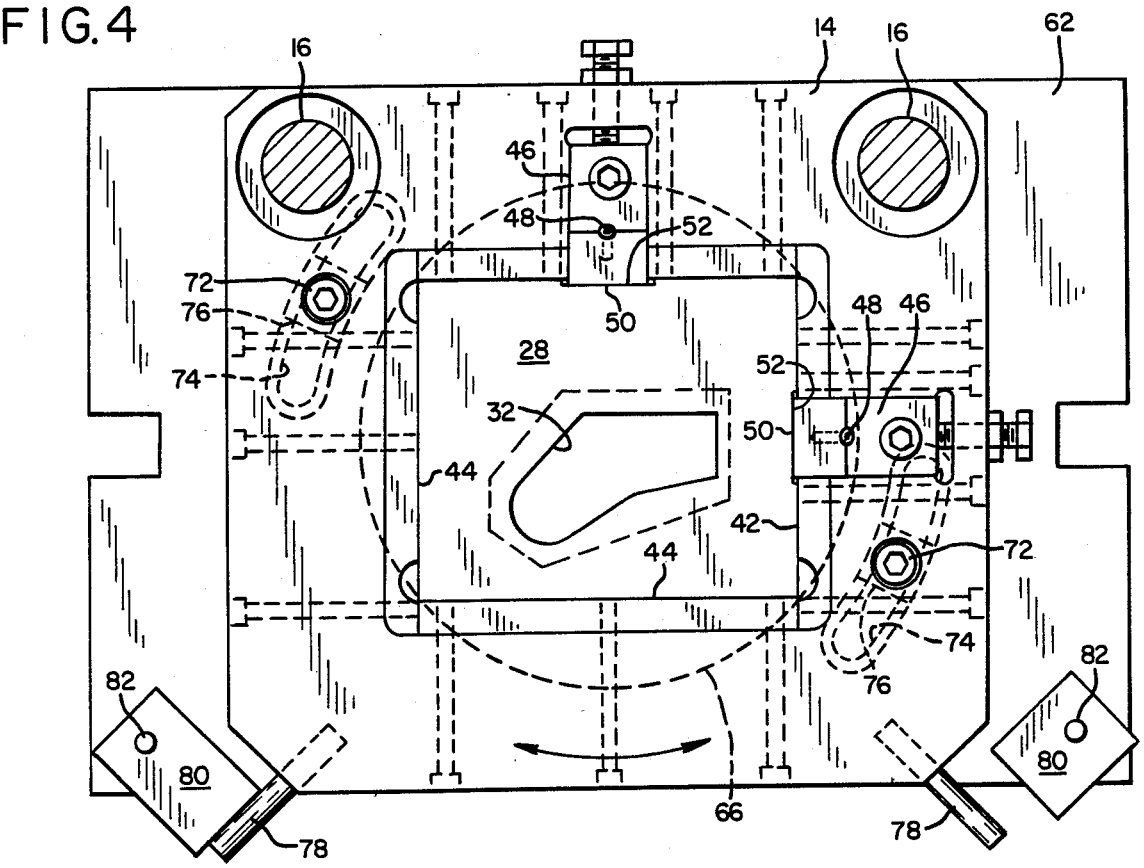
FIG. 4 is a sectional plan view of the master die set and unit die system taken along lines 4—4 of FIG. 2.

A base plate 62 associated with the bottom shoe is rigidly attached to the bed 64 of the punch press by any suitable means such as bolts or clamps. As may be seen in FIG. 2, the bottom shoe is mounted on the base plate by a bearing 66, coaxial with the shank bearing, formed by the mating surfaces of an annular collar 68 formed into the bottom surface of the bottom shoe and a coaxial circular shoulder 70 on the base plate. A pair of bolts 72 extend downwardly through the upper shoe and are received in arcuate T-slots 74 formed in the bottom surface of the base plate as shown in FIGS. 2 and 4. Threaded T-nuts 76 in the T-slots engagingly receive the bolts. Tightening the bolts in the T-nuts, which may be accomplished from the top surface of the bottom shoe while the die set is installed in the press, will prevent rotation of the bottom shoe with respect to the base plate. Since the shoes are interconnected by the guide posts and bushings, and since the shank bearing and base plate bearing are coaxial, loosening the bolts in the T-nuts allows the master die set to be rotated in the punch press, thereby rotating the die installed therein with respect to the workpiece.

The master die set of the present invention includes gage means for measuring and selecting the angular orientation of the master die set with respect to the base plate. As shown in FIGS. 1 and 4, a pair of horizontally-oriented dowels 78 project out of the bottom shoe to serve as indicators of the angular orientation of the master die set. As shown in FIG. 4, gage blocks 80 mounted on gage block posts 82 are used to set the desired preselected amount of rotation. The master die set is rotated until the appropriate dowel lies flush against the face of the selected gage block. Since the gage block is free to rotate on the gage block post, the gage block will rotate so that the dowel can lie flush against its face, insuring a high degree of accuracy. The appropriate dimensions of the gage block may be determined mathematically or empirically, and may be indexed in terms of degrees of rotation or, as will be explained below, related to a particular die to achieve a desired rotation of that die.

Although gage blocks and dowels are employed in this embodiment of the invention, it should be recognized that other gage means such as templates or micrometers could be used to measure rotation of the die block with respect to the base plate.

Figure 5:
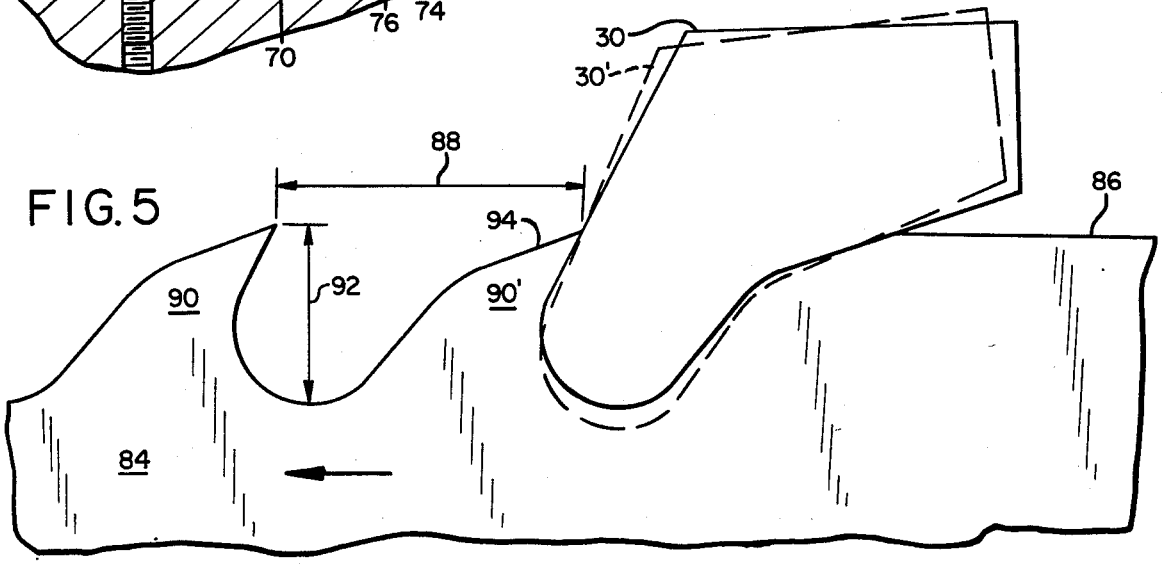
FIG. 5 shows a saw blade and punch illustrating the method of the present invention for rotating the die to form saw teeth of different gullet depth.

The rotatable aspect of the master die set has particular adaptation in a method for forming saw teeth from a common die, the saw teeth having different gullet depths. Referring to FIG. 5, a portion of a partially manufactured saw blade 84 is shown with a punch 30 superimposed on the saw blade stock 86. A rotated position of the same punch 30' is shown in dashed lines.

In an operation such as the manufacture of a saw blade, a punch feed system employing powered press rolls to align the stock to the punch press and incrementally feed the stock to the press as the press operates is commonly employed. A particular die used in conjunction with a constant incremental feed will form teeth of the same tooth length over a range of angular orientation of the die to the stock. However, angular rotation of the die with respect to the stock will significantally alter the gullet depth of the saw tooth.

Referring again to FIG. 5, the tooth length 88 is the distance from the tip of one tooth 90 to the tip of the next tooth 90'. The gullet depth 92 is the greatest distance between a line tangent to the tips of the teeth and the gullet of the saw blade. As can be seen in FIG. 5, angular reorientation of the punch results in significant variation of gullet depth without variation of tooth length. Small variations in the angle of the tooth back 94 can be corrected during the grinding phase of saw blade manufacture.

To employ the method of the present invention, a unit die having a punch and die opening arranged thereon in registry with one another is mounted in the master die set. A gage block corresponding to the particular gullet depth desired is mounted on the appropriate gage block post. The bolts 72 are loosened and the master die set is rotated until the associated dowel 78 lies flush against the gage block. The bolts are tightened and the punch press and feed system is operated to punch saw teeth of the desired gullet depth. If it is desired to punch saw teeth of the same tooth size, but of different gullet depth, the bolts are again loosened, the previously employed gage block removed and the appropriate gage block for the desired gullet depth placed upon the appropriate guide block post. The master die set may then be rotated into abutment with the new gage block, the bolts tightened and the press and feed system operated again to punch the saw teeth. It may be desirable to move the stock toward the back or front of the master die set, maintaining the same angular orientation of the stock to the punch press, to ensure that the finished saw blade is of the desired width, or to correct small variations in the angle of the tooth back. As previously noted, such small variations may usually be corrected at the grinding stage.

To cut saw teeth of a different tooth length, a new unit die with the appropriate punch and die opening arranged thereon along with a new set of gage blocks corresponding to that particular die could be quickly and easily installed in the master die set. However, it is important to note that each gage block corresponds to a particular gullet depth and is to be used with a particular die. Therefore, each die would have a set of gage blocks which correspond to the range of desired gullet depths for that die.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A master die set and unit die system for use in a punch press of the type having a ram moveable with respect to a bed for moving a punch with respect to a die comprising:
   (a) a master die set including a pair of opposed shoes;
   (b) said shoes including respective attachment means for attaching said shoes respectively to said ram and said bed of said punch press;
   (c) said master die set including means interconnecting said shoes for preventing all relative movement between said shoes except movement parallel to the movement of said ram;
   (d) a unit die including unit die blank means for arranging a die thereon and unit punch holder means for mounting a punch;
   (e) said unit die blank means and said unit punch holder means having predetermined dimensions;
   (f) said shoes including respective receptacle means for receiving said unit die blank means and said unit punch holder means;
   (g) each of said receptacle means including a floor and further including a pair of alignment surfaces, perpendicular to each other and substantially adjacent to each other;
   (h) said receptacle means including respective operable clamping means for selectively forcing said unit die blank means and said punch holder means against said respective alignment surfaces of said respective receptacle means and aligning said unit die blank means and said unit punch holder means in registry with each other; and
   (i) said respective clamping means being operable to reiteratively clamp said unit die blank means and said unit punch holder means in registry with one another while said shoes are operatively attached to said punch press.

2. The master die set and unit die system of claim 1 wherein said attachment means each include respective rotatable means, coaxial with each other, for rotating said master die set with respect to said punch press.

3. The master die set and unit die system of claim 2 wherein at least one of said respective rotatable means includes operable stop means for selectively preventing rotation of said master die set with respect to said punch press.

4. The master die set and unit die system of claim 1 wherein said respective alignment surfaces and said respective floor associated with each receptacle means define a corner of said receptacle means.

5. The master die set and unit die system of claim 4 wherein said operable clamping means of said respective receptacle means may be selectively operated to force said unit die blank means and said unit punch holder means, respectively, into said corner of said respective receptacle means.

6. The master die set and unit die system of claim 1 further including respective retaining means for urging said unit die blank means and said unit punch holder means, respectively, against said floor of said respective receptacle means.

7. A die det for use in a punch press of the type having a ram movable with respect to a bed comprising:
   (a) a first shoe including means for attaching said first shoe to said ram;
   (b) a second shoe;
   (c) base plate means for attachment to said bed of said punch press;
   (d) bearing means rotatably interconnecting said second shoe with said base plate means about an axis parallel to the movement of said ram;
   (e) means interconnecting said first shoe to said second shoe for preventing all relative movement between one another except for movement parallel to the movement of said ram; and (f) said means for attaching said first shoe to said ram including rotatable means coaxial with said bearing means for permitting said first shoe to rotate with respect to said ram while said first shoe is attached to said ram, so that said first shoe can rotate in unison with said second shoe.

8. The die set of claim 7 including operable stop means for selectively preventing the rotation of said shoes with respect to said punch press and for selectively fixing the angular orientation of said shoes to said punch press.

9. The die set of claim 8 wherein said stop means cooperates with said base plate means and said second shoe.

10. The die set of claim 7 further including gage means for indicating the rotational relationship of said shoes with respect to said punch press.

11. The die set of claim 10 wherein said gage means cooperates with said base plate means and said second shoe.

12. The die set of claim 10 wherein said gage means includes abutment means for selectively limiting the rotation of said shoes with respect to said punch press to a predetermined rotational relationship.

13. An apparatus for forming saw teeth of predetermined length and variable gullet depth in a workpiece employing a die set of the type having a pair of opposed shoes, said apparatus comprising:

(a) a punch attached one of said shoes of said die set;
(b) a die opening arranged on said other shoe of said die set in registry with said punch;
(c) means for rotatably mounting said die set to said punch press about an axis; and
(d) gage means cooperating with said die set and said punch press for indicating the rotational relationships of said die set with respect to said punch press.

14. The apparatus of claim 13 wherein said gage means includes abutment means for selectively limiting the rotation of said die set with respect to said punch press to a predetermined rotational relationship.

15. The apparatus of claim 14 including a plurality of abutment means, each one of said abutment means adapted to limit the rotation of said die set with respect to said punch press so as to form saw teeth of a predetermined gullet depth.

16. A master die set comprising:

(a) a pair of opposed shoes;
(b) said shoes including respective receptacle means for receiving, retaining and aligning a matched die blank and punch holder having predetermined dimensions;
(c) said receptacles respectively including three substantially mutually adjacent alignment surfaces cooperating to define alignment means for aligning said die blank and said punch holder in opposed registry with one another.

17. The master die set of claim of 16 wherein each one of said three alignment surfaces is perpendicular to at least one other of said alignment surfaces.

18. The master die set of claim 16 wherein said three alignment surfaces define a corner of said respective receptacle means.

* * * * *

UNITED STATES PATENT AND TRADEMARK OFFICE
CERTIFICATE OF CORRECTION

PATENT NO. : 4,610,185

DATED     : Sept. 9, 1986

INVENTOR(S) : Daniel E. France

It is certified that error appears in the above-identified patent and that said Letters Patent is hereby corrected as shown below:

Col. 2, Line 36    Change "retangular" to --rectangular--

Col. 5, Lines 9 and
              10    Change "diagionally" to --diagonally--

Col. 7, Line  7    Change "significantally" to --significantly--

Col. 8, Line 57    Change "det" to --set--

Col. 9, Line 31    After "attached" insert --to--

Signed and Sealed this

Tenth Day of March, 1987

*Attest:*

DONALD J. QUIGG

*Attesting Officer*  *Commissioner of Patents and Trademarks*